Jan. 4, 1966   H. SCHILL   3,227,934
WOUND ELECTRIC CAPACITOR
Filed Feb. 1, 1961
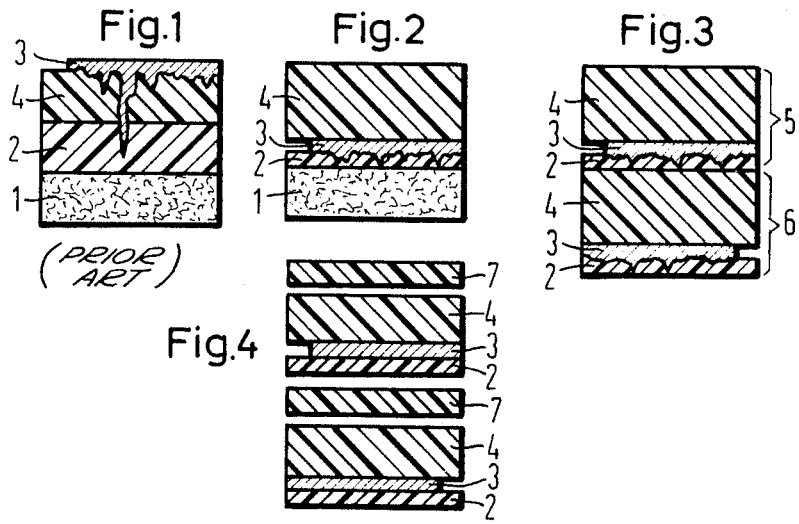
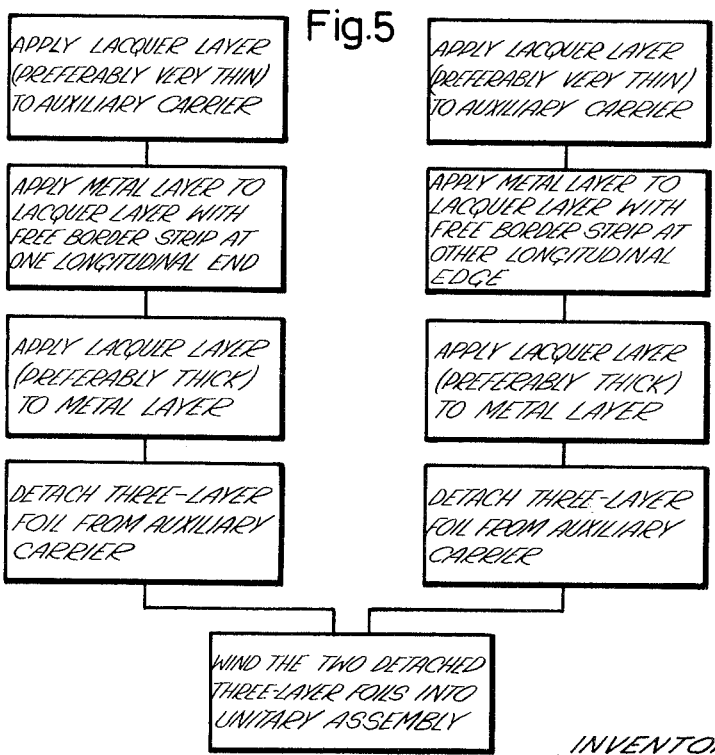
INVENTOR
HERMANN SCHILL

3,227,934
WOUND ELECTRIC CAPACITOR

Hermann Schill, Munich, Germany, assignor to Siemens & Halske Aktiengesellschaft, Berlin and Munich, Germany, a corporation of Germany
Filed Feb. 1, 1961, Ser. No. 86,518
Claims priority, application Germany, Apr. 25, 1960, S 68,213
3 Claims. (Cl. 317—260)

This invention is concerned with a wrapped electric capacitor employing a dielectric in the form of a thin strip, preferably less than 6 microns thick, on which is provided a thin an preferably regenerative metallic coating.

Capacitors employing thin strips as dielectrics are made by placing a varnish layer upon an auxiliary carrier foil, providing the varnish layer with a metal coating, and peeling off the varnish layer carrying the metal coating from the auxiliary foil prior to or during the wrapping operation. The customary procedure involved placing a first varnish layer upon an auxiliary carrier foil which is preferably pretreated to provide suitable adhesive strength, thereupon placing upon the first varnish layer a second similar varnish layer, and thereafter producing the metal coating by vaporization. The fine metal particles thereby penetrate into and fill the pores and holes of the varnish film, thus producing metal peaks extending thereinto. In the operation of a capacitor made of such metal coated varnish layers, very high electric fields will appear at the metal peaks formed in the varnish, thus resulting in considerable reduction of the breakdown strength of the capacitor. Those of the metal peaks which do not form short circuits between the coatings are not recognized in the testing of capacitors after production thereof and therefore remain in the structure. It is only in extended operation that fault points appear owing to excessive field strength at the peaks, such fault points resulting in reduction of insulating qualities.

In order to avoid these drawbacks, the invention proposes a method of making an electric capacitor with a dielectric formed by a strip which is preferably less than 6 microns thick and provided with a thin regenerative coating, comprising placing upon a suitable auxiliary carrier foil a first thin varnish layer, metallizing upon such first varnish layer a metallic coating while leaving a marginal portion free, placing upon such metal coating a second and preferably thicker varnish layer, and taking at least two such composite three-layer foils with the metal coating of one foil displaced with respect to the metal coating of the other foil for winding a wrapped capacitor package therefrom.

The second varnish layer provided upon the metal coating is free of metal peaks, thus forming a dielectric with high breakdown strength. The first varnish layer which is by the subsequent metal vaporization permeated with metal peaks, is preferably made as thin as at all possible. An unmetallized dielectric foil may be placed between the two three-layer foils and wrapped therewith, in order to produce a capacitor with further increased breakdown strength.

The method according to the invention permits production of capacitors with greatly improved properties without requiring any additional expenditures. Only the sequence of steps need be changed in the production process.

The invention will now be described with reference to the accompanying drawing in which FIG. 1 shows a composite three-layer foil of known and heretofore customary construction;

FIG. 2 represents a composite three-layer foil made according to the invention;

FIG. 3 shows two superposed composite three-layer foils;

FIG. 4 shows two superposed composite three-layer foils with an additional dielectric foil disposed therebetween; and FIG. 5 illustrates, in block form, the method of producing a capacitor in accordance with the invention.

In the known and heretofore customary construction as shown in FIG. 1, there is provided upon the auxiliary foil 1 a first varnish layer 2 and upon the latter a second varnish layer 4, such second varnish layer carrying the metal coating 3. It will be noted that the metal vaporized during application of the coating 3 will be deposited in the pores present in the lacquer layers 2 and 4, forming the metal points shown, largely in the lacquer layer 4, but, under some circumstances, also in lacquer layer 2.

The composite three-layer foil according to the invention employs an auxiliary carrier foil 1 upon which is provided a thin varnish layer 2, followed by a metal coating 3, the latter carrying a second and preferably thicker varnish layer 4. Here too, in the application of the metal coating 3, metal points will be created in the pores of the first lacquer layer 2, the length of such points, however, being limited by the thickness of the lacquer layer 2, while the lacquer layer 4 disposed thereon is completely free of any penetrating metal points. If, as illustrated in FIG. 2, the lacquer layer 2 is made especially thin, and on the other hand, the lacquer layer is made correspondingly thicker, any point length of the layer 2 is still further reduced and the breakdown strength of the capacitor produced from such capacitor foils is correspondingly increased.

FIG. 3 shows two superposed composite three-layer foils indicated respectively by numerals 5 and 6, such foils resulting after peeling off of the layers from the auxiliary carrier foil 1 indicated in FIG. 2. The metal coatings 3 are shown in laterally displaced relationship as they appear in a completed wrapped capacitor package. This is accomplished by providing a free border strip or margin of lacquer along one longitudinal edge of the metal coating, which is reversed on adjacent three-layer foils. Thus in FIG. 3 the free border strip is disposed at the left hand side of the upper foil and at the right hand side of the lower foil.

Where especially high demands are made on the breakdown strength of the dielectric in constructions corresponding to that of FIG. 3, it is possible to increase such strength by the use of additional, independently produced dielectric foils of paper, plastic or the like. Such a construction is illustrated in FIG. 4, which employs two three-layer foils such as illustrated in FIG. 3, between which is disposed the independent foil 7.

FIG. 5 illustrates, in block form, a diagram of the process utilized in the invention. On the left hand side is represented the individual operating steps for the production of one three-layer foil, and on the right hand side of the operating steps for the production of a second three-layer foil. Following detachment of the respective three-layer foils from the auxiliary carrier they are wound or wrapped together to form the capacitor body having considerably increased breakdown strength while the external dimensions remain substantially the same.

Thorough testing of the capacitor made according to the invention revealed favorable electrical properties exceeding all expectations. The insulation value was by approximately the factor 2 higher than that of capacitors made according to the previously known method. The insulation of the wrapped capacitor made according to the invention remained constant even at voltage overloads, while capacitors made according to the previously known method showed at voltage overloads a strong drop of the insulation resistance. The loss factor remained, as compared with thin-foil capacitors of previously known construction, likewise constant at increased voltages. This warrants the conclusion that the contacting of the coating embedded between two varnish layers is not only faultlessly possible but surprisingly considerably better than in the case of freely accessible coatings as they are provided in the previously known structures.

Changes may be made within the scope and spirit of the appended claims which define what is believed to be new and desired to have protected by Letters Patent.

I claim:

1. A wound electrical capacitor comprising at least two composite foils wound to form a capacitor, each composite foil consisting of two strip-like varnish layers amounting to less than 6 microns, and a metal coating disposed between said layers, said metal coating having a relatively smooth surface at one face thereof and a relatively rough surface at the opposite face thereof with the metal forming the same filling the pores of the adjacent varnish layer, any metal peaks of said relatively rough surface having a height which is at most equal to the thickness of such adjacent varnish layer, the other varnish layer having a thickness at least equal to that of said first mentioned varnish layer and forming the primary capacitor dielectric, said second varnish layer being disposed at the smooth face of said metal coating free of metal penetration in any pores thereof and having a highly uniform operative thickness, the metal coating on one of said composite foils extending from one lateral edge of the varnish layers thereof flush with such edge to a point spaced from the opposite lateral edge of the varnish layers thereof to form a metal-free border strip threat, the metal coating of the other composite foil being similarly disposed but with the metal coating spaced from the opposite lateral edge of the varnish layers thereof to form a metal-free border strip thereat, each of the respective metal coatings thus extending to a respective end of the capacitor.

2. A wound electric capacitor comprising at least two composite foils wound to form a package, each composite foil consisting of two strip-like varnish dielectric layers of different thickness, amounting to less than 6 microns, and a metal coating disposed between said layers which extends from one lateral edge of said layers flush with such edge to a point spaced from the other lateral edge thereof, the thinner of the two layers having the pores of its adjacent face filled wtih metal of said coating, and the thicker of the two layers having its face adjacent said metal coating free of metal penetration in any pores thereof to provide a dieletric layer of highly uniform operative thickness, said two composite foils being arranged one with respect to the other with the respective edges of said metal coatings which are flush with the edges of the varnish layers of each composite foil being disposed at respective ends of the capacitor.

3. A wound electric capacitor according to claim 2, comprising at least one dielectric foil disposed between said composite foils.

References Cited by the Examiner

UNITED STATES PATENTS

| | | | |
|---|---|---|---|
| 2,816,273 | 12/1957 | Peck | 317—260 |
| 2,935,668 | 5/1960 | Robinson | 317—260 |
| 2,958,117 | 11/1960 | Robinson et al. | 117—217 |
| 2,975,345 | 3/1961 | Koller | 317—260 |
| 3,049,651 | 8/1962 | Adelson et al. | 317—258 |

FOREIGN PATENTS

| | | |
|---|---|---|
| 669,443 | 8/1963 | Canada. |
| 831,537 | 3/1960 | Great Britain. |

JOHN F. BURNS, *Primary Examiner.*

SAMUEL BERNSTEIN, JOHN P. WILDMAN,
*Examiners.*